(12) United States Patent
Tarafder (10) Patent No.: US 10,613,061 B2
(45) Date of Patent: Apr. 7, 2020

(54) SYSTEMS, METHODS AND DEVICES ADDRESSING SAMPLE EXTRACTION AND INJECTION PROBLEMS IN CHROMATOGRAPHY

(71) Applicant: Waters Technologies Corporation, Milford, MA (US)

(72) Inventor: Abhijit Tarafder, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 66 days.

(21) Appl. No.: 16/070,898

(22) PCT Filed: Jan. 19, 2017

(86) PCT No.: PCT/US2017/014092
§ 371 (c)(1),
(2) Date: Jul. 18, 2018

(87) PCT Pub. No.: WO2017/127516
PCT Pub. Date: Jul. 27, 2017

(65) Prior Publication Data
US 2019/0195838 A1 Jun. 27, 2019

Related U.S. Application Data

(60) Provisional application No. 62/280,849, filed on Jan. 20, 2016.

(51) Int. Cl.
*B01D 11/02* (2006.01)
*B01D 15/12* (2006.01)
(Continued)

(52) U.S. Cl.
CPC .......... *G01N 30/06* (2013.01); *B01D 11/0203* (2013.01); *B01D 11/028* (2013.01);
(Continued)

(58) Field of Classification Search
CPC ............ B01D 11/0203; B01D 11/0219; B01D 11/028; B01D 11/0288; B01D 15/12;
(Continued)

(56) References Cited

U.S. PATENT DOCUMENTS

| 4,070,294 A | 1/1978 | Fujita et al. |
| 4,158,630 A * | 6/1979 | Stearns .................. G01N 30/20 210/198.2 |

(Continued)

OTHER PUBLICATIONS

International Search Report and the Written Opinion from Corresponding PCT/US2017/014092; Completed on Mar. 13, 2017; dated May 18, 2017.

(Continued)

*Primary Examiner* — Jennifer Wecker
(74) *Attorney, Agent, or Firm* — Womble Bond Dickinson (US) LLP; Deborah M. Vernon; Benedict Hanrahan (57) ABSTRACT

In a chromatography system, including within the system an extraction vessel which receives a mixture of mobile phase and co-solvent and provides a mixture of mobile phase and co-solvent with sample to a chromatography column to increase sample concentration within the mixture. In addition, adding a reservoir to the chromatography system to form an extraction-pressurization system, wherein the mixture with sample may be collected in the reservoir and may diffuse and equilibrate to an approximately uniform sample concentration before being provided to the chromatography column. Also in addition, providing a plurality of extraction-pressurization systems to allow near-simultaneous extraction of sample and loading of the column, or concurrent extraction and loading by the plurality of extraction-pressurization systems.

18 Claims, 9 Drawing Sheets

(51) Int. Cl.

| | |
|---|---|
| *G01N 30/06* | (2006.01) |
| *G01N 1/40* | (2006.01) |
| *G01N 30/08* | (2006.01) |
| *G01N 30/34* | (2006.01) |
| *B01D 15/16* | (2006.01) |
| *G01N 30/20* | (2006.01) |
| *G01N 30/22* | (2006.01) |
| *G01N 35/10* | (2006.01) |
| *B01D 17/12* | (2006.01) |
| *G01N 30/24* | (2006.01) |
| *G01N 30/02* | (2006.01) |
| *G01N 30/32* | (2006.01) |
| *G01N 35/04* | (2006.01) |
| *G01N 30/00* | (2006.01) |
| *B01D 15/40* | (2006.01) |

(52) U.S. Cl.
CPC ...... *B01D 11/0219* (2013.01); *B01D 11/0288* (2013.01); *B01D 15/12* (2013.01); *B01D 15/166* (2013.01); *B01D 17/12* (2013.01); *G01N 1/4055* (2013.01); *G01N 30/02* (2013.01); *G01N 30/08* (2013.01); *G01N 30/20* (2013.01); *G01N 30/22* (2013.01); *G01N 30/24* (2013.01); *G01N 30/32* (2013.01); *G01N 30/34* (2013.01); *G01N 35/1097* (2013.01); *B01D 15/40* (2013.01); *G01N 2001/4061* (2013.01); *G01N 2030/009* (2013.01); *G01N 2030/062* (2013.01); *G01N 2030/085* (2013.01); *G01N 2030/201* (2013.01); *G01N 2030/207* (2013.01); *G01N 2030/328* (2013.01); *G01N 2030/347* (2013.01); *G01N 2035/0444* (2013.01)

(58) Field of Classification Search
CPC ...... B01D 15/166; B01D 15/40; B01D 17/12; G01N 1/4055; G01N 2001/4061; G01N 2030/009; G01N 2030/062; G01N 2030/085; G01N 2030/201; G01N 2030/207; G01N 2030/328; G01N 2030/347; G01N 2035/0444; G01N 30/02; G01N 30/06; G01N 30/08; G01N 30/20; G01N 30/22; G01N 30/24; G01N 30/32; G01N 30/34; G01N 35/1097

See application file for complete search history.

(56) References Cited

U.S. PATENT DOCUMENTS

| | | |
|---|---|---|
| 4,900,336 A | 2/1990 | Shiomi et al. |
| 5,116,508 A | 5/1992 | Kumar et al. |
| 5,240,603 A * | 8/1993 | Frank ................ B01D 11/0203 203/49 |
| 5,322,626 A | 6/1994 | Frank et al. |
| 5,542,965 A | 8/1996 | Straubinger et al. |
| 5,660,727 A | 8/1997 | Gleave et al. |
| 2007/0264175 A1 | 11/2007 | Iverson et al. |
| 2011/0016955 A1 | 1/2011 | Cormier |
| 2015/0316516 A1 | 11/2015 | Albrecht, Jr. |

OTHER PUBLICATIONS

International Search Report and the Written Opinion from International Application No. PCT/US2017/014095; Completed on Mar. 6, 2017; dated May 24, 2017.
Rajendran, Design of Preparative-Supercritical Fluid Chromatography, J Chromatography A, 1250 (2012), pp. 227-249.
Guiochon et al. "Fundamentals of Preparative and Nonlinear Chromatography." New York: Elsevier Academic Press. (Mar. 2006).
Miller. "Sampling." Chromatography: Concepts and Contrasts. New Jersey: Wiley-Interscience. (2005): 238-240.

* cited by examiner

SYSTEMS, METHODS AND DEVICES ADDRESSING SAMPLE EXTRACTION AND INJECTION PROBLEMS IN CHROMATOGRAPHY

CROSS-REFERENCE TO RELATED APPLICATIONS

This application is a National Stage Application of International Application No. PCT/US2017/014092, filed Jan. 19, 2017, which claims priority to U.S. Provisional Patent Application Ser. No. 62/280,849, filed Jan. 20, 2016, and entitled "Systems, Methods and Devices Addressing Sample Extraction and Injection Problems in Chromatography." Each of the foregoing applications is incorporated herein by reference in its entirety.

FIELD OF THE INVENTION

The present invention generally relates to chromatography systems, and in particular, systems, methods and devices for increasing the concentration, and uniformity of concentration, of analytical sample in highly-compressible fluid chromatography (e.g., $CO_2$-based chromatography).

BACKGROUND

Highly-compressible fluid chromatography is a type of chromatography that is configured to operate with a solvent that includes a fluid (e.g., carbon dioxide, Freon, etc.) that is in a gaseous state at ambient/room temperature and pressure. Typically, highly-compressible fluid chromatography involves a fluid that experiences noticeable density changes over small changes in pressure and temperature. Although highly-compressible fluid chromatography can be carried out with several different compounds, in the current document $CO_2$ will be used as the reference compound as it is the most commonly employed. (It is noted that highly-compressible fluid chromatography has also been referred to as $CO_2$-based chromatography, or in some instances as supercritical fluid chromatography (SFC), especially where $CO_2$ is used as the mobile phase. In this application, mobile phase is used as a term to describe the primary source of a combined flow stream flowing through a chromatography column. For example, in a separation in which CO2 and methanol (a co-solvent) are mixed together to create a combined flow stream passing through a chromatography column, the term mobile phase will refer to the $CO_2$ and the methanol will be referred to as a co-solvent. The combined mobile phase and co-solvent will be referred to as mobile phase co-solvent mixture or mobile phase solution.)

Highly-compressible fluid chromatography combines many of the features of liquid chromatography (LC) and gas chromatography (GC), and can often be used for separations with compounds that are not suitable either for LC or GC. For example, $CO_2$-based chromatography can be advantageous for separation and analysis of hydrophilic and chiral compounds, lipids, thermally-labile compounds and polymers. Other advantages include faster separations, and lower cost and toxicity of the mobile phase, when using $CO_2$ as a solvent, compared to many liquid mobile phases typically used in LC. In a highly-compressible fluid system, typically a smaller quantity of organic solvent, or even no organic solvent, may be used, and as a result a concentrated solution of a compound can be obtained without the need to evaporate a large quantity of solvent in the eluent.

Additionally, certain analytical samples may exhibit higher solubility in highly-compressible fluids, or in a mixture of a highly-compressible fluid and co-solvents, than in the liquid mobile phases typically used in LC. This increased solubility is applied to extractions in a range of settings, from the research laboratory to industrial coffee decaffeination, generally under the name of super-critical fluid extraction. In either setting, the highly-compressible fluid can improve the ability of the system to dissolve the sample.

In addition to carbon dioxide, a liquid organic co-solvent is typically added. The co-solvent may also be referred to as a modifier; the terms are used interchangeably herein. A common co-solvent is methanol. Examples of other co-solvents include acetonitrile and alcohols such as ethanol and isopropanol. The $CO_2$ mobile phase and co-solvent (if any) mixture is maintained at a pressure and temperature where the mixture remains as a homogeneous, single phase. To do so, systems must be able to provide and maintain tight control over temperature, pressure, etc. In systems where the sample is dissolved in an organic solvent for injection, frequently, but not necessarily, the same solvent will be used as the co-solvent.

One factor that influences the separation power of any chromatographic system is the efficiency of the system, which is reduced by band broadening or band dispersion produced by the system. The terms "band broadening" and "band dispersion" are used interchangeably herein. Brand broadening negatively affects efficiency, as a result, a reduction in band broadening will improve the separation power of an instrument.

Figure 1A:
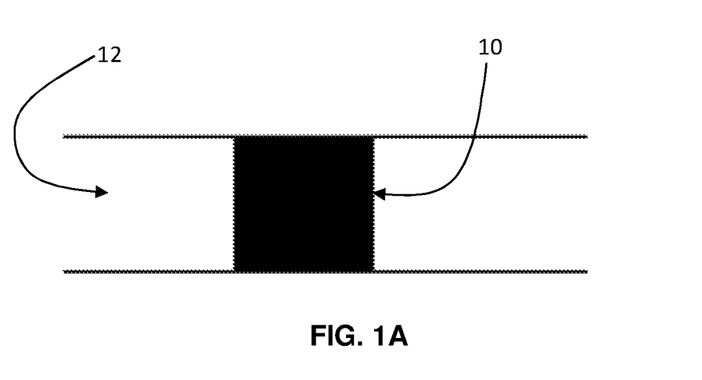
FIG. 1A illustrates an ideal sample band between the injector and the column.
Figure 1B:
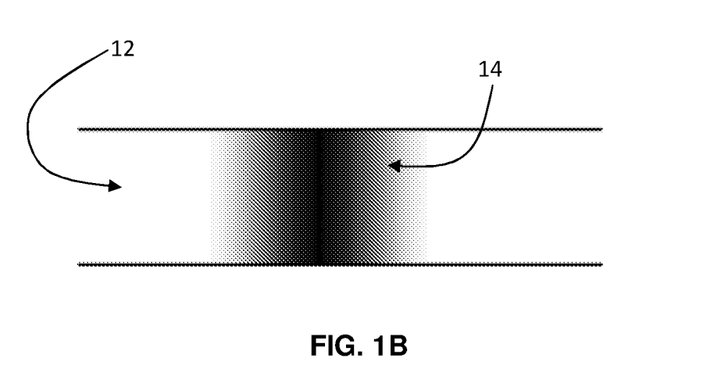
FIG. 1B illustrates a diffused sample band between the injector and the column.

Extra-column band broadening (i.e., band broadening attributed to system components lying outside of the column) can occur in a chromatography system due to various factors. For example, upstream of the column, dispersion can occur after the band leaves the injector, while it is traveling towards the column inlet. An ideal sample leaves the injector as a rectangular band 10 in a conduit 12, e.g., as shown in FIG. 1A. After the sample band leaves the injector, the band is transported from the injector to the column inlet. The diffusivity of analytes in the mobile phase, the co-solvent, and in the mixture of the two determines dispersion while the band travels along the tubing connecting the injector to the column inlet—higher diffusivity and increased connecting tube volume and number of other connectors contribute to increased band broadening. For example, FIG. 1B illustrates a diffused sample band 14 in a conduit 12. Analyte diffusivity in typical highly-compressible fluid mobile phases, such as $CO_2$, is generally greater than in solvents used in conventional LC, which could result in a diffused band at the column inlet. Another factor that can affect dispersion inside the column is a mismatch between the composition of the sample solvent and the mobile phase. For example, severe band distortion leading to separation loss can take place if a sample is prepared in a solvent having a composition markedly different than the composition of the mobile phase. See Mishra M, Rana C, De Wit A, Martin M., Influence of a strong sample solvent on analyte dispersion in chromatographic columns, J Chromatogr A. 2013 Jul. 5; 1297:46-55. Another factor that can lead to band broadening is additional volume added to a system outside the column, i.e., adding multiple fluidic lines, components (e.g., mixers) or connectors.

In conventional $CO_2$-based chromatography preparative systems, there are two commonly used techniques for injecting sample/feed solution into the mobile stream. See Arvind Rajendran, Design of preparative supercritical fluid chromatography, J Chromatogr. A., 2012 Jun. 7; 1250:227-249.

The first conventional technique (illustrated in FIG. 2), which is also commonly used in HPLC, injects the feed solution directly into the $CO_2$ plus co-solvent/modifier mixture. For this technique, the feed solution is generally prepared by dissolving the sample in the co-solvent to permit injection. This technique, however, can lead to significant distortion of the chromatographic band even when injecting moderate volume of the feed solution. This is because the solvent used to prepare the feed solution will only be the organic solvent, leading to significant mismatch in feed solvent versus mobile phase and co-solvent mixture. The second technique (illustrated in FIG. 3), which is used to address mismatch, is to inject the sample directly into the co-solvent before the co-solvent is mixed with the $CO_2$. Here too, the sample is introduced to the chromatography system by addition to co-solvent only, and the amount of sample that may be added is thus limited by the dissolving power of the co-solvent. This technique has further limitations due to problems associated with mixing of the sample/feed solution with co-solvent. That is, the mixing process can significantly distort the feed band profile, resulting in extra-column band dispersion, which can lead to overlapping peaks inside the column resulting in yield loss, especially for close-eluting analytes, or impurities.

Additionally, when the feed solution is prepared without $CO_2$, the solubility of the sample in the feed solution may be different from the solubility in the mobile phase and co-solvent mixture. This difference may cause problems within the system: if the solubility is greater in the mixture, then operating the system at the solubility associated with the feed solution will result in a lowered concentration than could be obtained; conversely, if the sample solubility is lower in the feed solution, when the feed solution is introduced into the mixture, the sample may crystallize, or crash-out of solution.

Figure 4A:
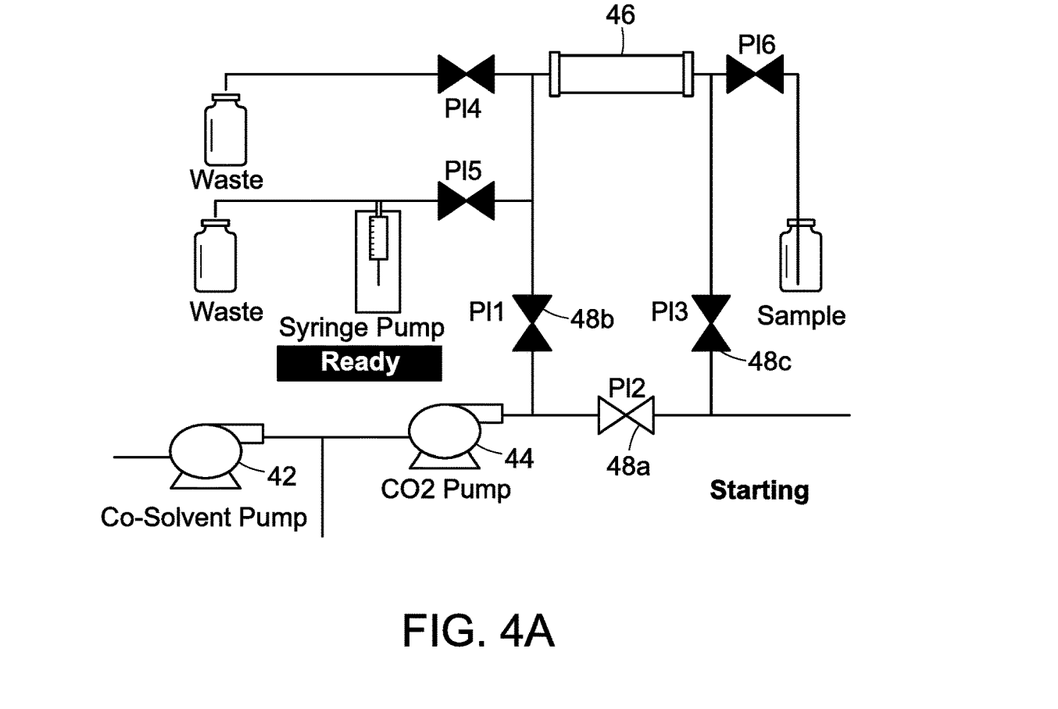
FIGS. 4A, 4B, and 4C schematically illustrate steps in a prior art method of sample extraction.
Figure 4B:
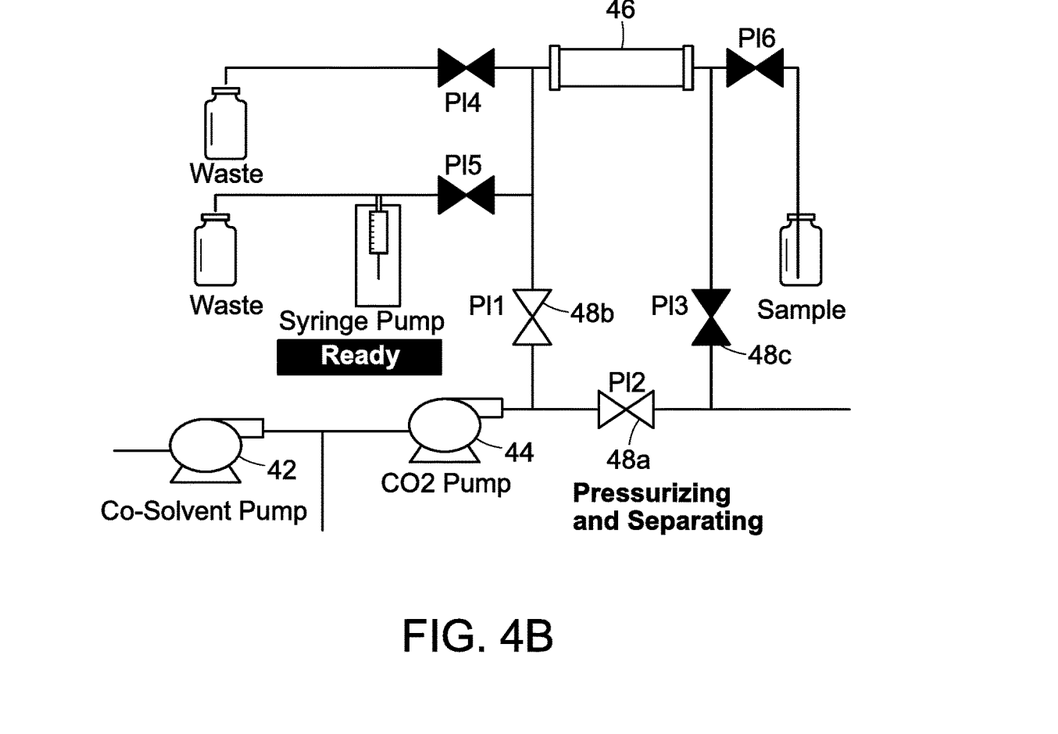
Figure 4C:
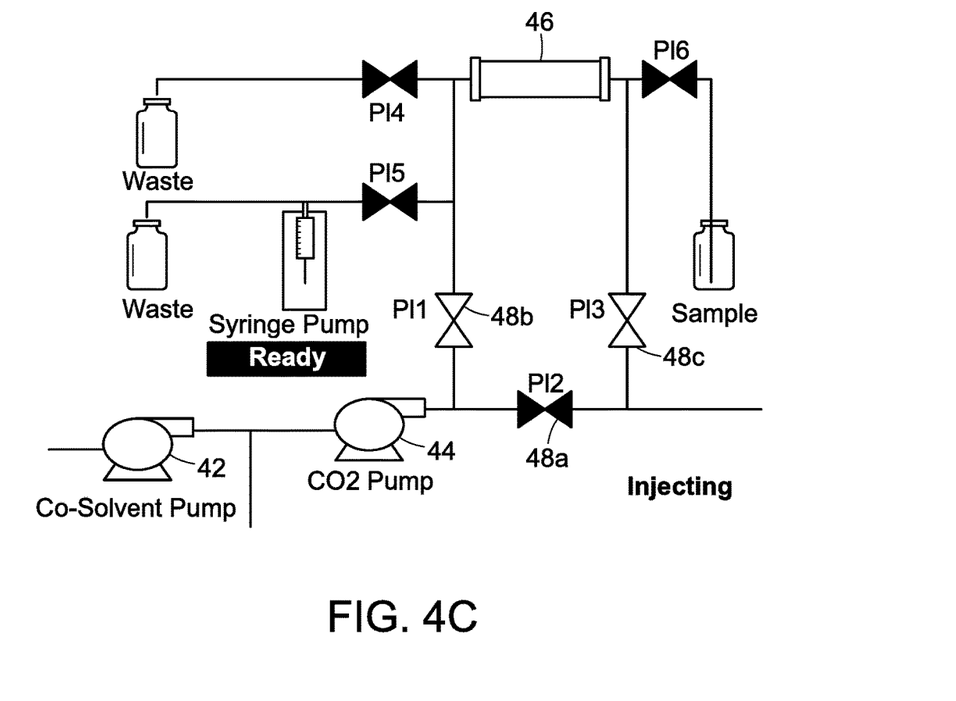

Another approach to address solubility problems is to provide an extraction injection device. Such a system, as shown in FIGS. 4A, 4B, and 4C, uses an extraction vessel connected to the co-solvent and mobile phase pumps to allow for solubilizing the feed/sample material inside the extraction vessel. Once solubilized, the extraction vessel is used for injection into the chromatography system. While this method reduces the amount of precipitation, operators have less control over feed injection (e.g., varying injection amounts) as there is limited control over the flow from the extraction vessel. Additionally, the flow from the extraction vessel may exhibit inconsistent sample concentration across the flow.

Accordingly, there remains a need for a sample extraction device that integrates the extraction process into the chromatography system with controlled sample injection.

SUMMARY

A significant increase in the sample concentration of the feed solution used in the chromatography system can be achieved by incorporating the extraction vessel within the disclosed chromatography system with decoupled sample injection, as provided herein. In particular, by having an extraction vessel within the chromatography system of the present application, the chromatography system can achieve a more complete extraction and solubilization of the sample and an increased concentration of the sample within the feed solution. Additionally, the chromatographic system can operate with a higher concentration of sample because solvent mismatch problems are reduced.

The present technology additionally achieves reduced extra-column band broadening in part by decoupling the injection system from the main solvent flow line. The injection system herein may include the extraction vessel, sample loop, and a reservoir, to the extent that any particular embodiment includes such features, such that the sample feed solution will be prepared in the decoupled injection system, then provided to the chromatography column, preferably with effective injection occurring as close as possible to the column inlet. Systems and methods for such decoupling can allow for the injection of larger volumes of sample without compromising separation yield, increase the column loading per batch, and increase the overall yield of separations. That is, by removing (e.g., decoupling) sample injection from the main mobile phase flow line, extra-column band dispersion is reduced. While adding extra volume, i.e., the decoupled injection system, to a highly-compressible fluid chromatography system is typically avoided in the art, the inventors have surprisingly found that by decoupling column loading and column injection by having dedicated flow lines, and by introducing an integrated extraction process, extra-column band broadening can be reduced and sample concentration increased.

Solvent mismatch problems arise where the feed solution consists of a different mobile phase and co-solvent mixture than that used in the chromatography column. Upon addition of the feed solution to the system, the interaction of the feed solution with the flowstream supplying the chromatography column may result in a portion of the sample precipitating out of solution if the sample solubility in the flowstream is lower than in the feed solution, which would stop the analysis and require maintenance of the system. To anticipate solvent mismatch and to avoid precipitation, operators may use a lower sample concentration, further reducing productivity.

The present system provides both mobile-phase and co-solvent within the system, and may be set to provide substantially the same mixture at substantially the same pressure, in both the injection system and the main solvent flow line, reducing solvent mismatch problems. The integration of the extraction process within the chromatography system also reduces sample precipitation issues because the amount of sample that has been dissolved into the mobile phase and co-solvent mixture is necessarily an amount of sample that can be dissolved within that amount of mixture, assuming the same conditions (e.g., temperature, pressure, etc.). The present chromatography system may be operated with a plurality of mobile phase and co-solvent sources, or with a single set of sources feeding the entire system. In an embodiment, an extraction vessel will be fed by a first mobile phase source and a first co-solvent source, and a chromatography column will be fed by a second mobile phase source and a second co-solvent source. In an embodiment, a mobile phase source and a co-solvent source will feed a flow controller through a mixer and the flow controller will direct flow to an extraction vessel and to a chromatography column. Or, the system may be established with a single mobile phase source and a plurality of co-solvent sources, which may be advantageous for preparing mixed or gradient co-solvent solutions.

In an embodiment, the system may additionally be provided with components to increase the uniformity of sample concentration in the feed solution prepared for injection. For samples with certain solubility characteristics, the concentration of the sample within the feed solution as it leaves the extraction vessel may be inconsistent. Inconsistency in the supplied sample concentration can reduce the quality of the separation. In an ideal theoretical chromatography system, all sample would be introduced at the same instant to the chromatography column. In reality, however, the sample loading process always requires some period of time over which the sample is introduced to the column. If the solution provided over that period of time has an inconsistent concentration of sample, the quality of the separation will be reduced.

Figure 6A:
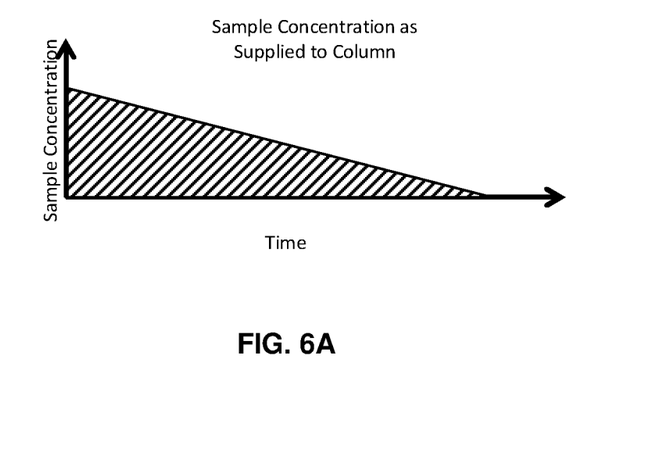
FIG. 6A illustrates an inconsistent sample concentration profile.

This inconsistency of sample concentration may be due to one or more factors. For example, in an initial phase of operation, the extraction vessel may supply a low concentration of sample until the extraction vessel is fully saturated with mobile phase and co-solvent. Additionally, the concentration of sample provided by the extraction vessel will generally decrease over time, as the extraction process occurs and the amount of sample remaining in the extraction vessel declines. This problem is depicted in FIG. 6A, which features a graph showing decreasing concentration of sample provided to a chromatography column from an extraction vessel.

For some sample extractions, neither low initial concentration nor decreasing concentration will be problematic. For example, a highly soluble sample will exhibit little or no low initial concentration, as the mobile phase and co-solvent mixture will readily absorb the sample. And, when the amount of sample within the extraction vessel is large relative to the amount of sample being extracted for the separation, the decrease in sample available in the extraction vessel, and thus the decrease in concentration in the feed solution supplied, will be negligible.

For sample extractions where low initial concentration is relevant, one or more initial extraction operations could be performed in the present chromatography system, with the resulting feed solution sent to waste or to the recovery/collection/recycling, until a suitable feed solution is obtained.

Additionally, for sample extractions where either low initial concentration or declining concentration, or both, are an issue, an embodiment of the present chromatography system may further be provided with a reservoir fed by the extraction vessel. In the reservoir, the mixture of mobile phase and co-solvent supplied with sample from the extraction vessel may be permitted to mix to achieve a feed solution having a uniform concentration of sample throughout the reservoir. Additionally, a means may be provided in the reservoir to increase the rate of mixture, such as a stirring apparatus.

Figure 6B:
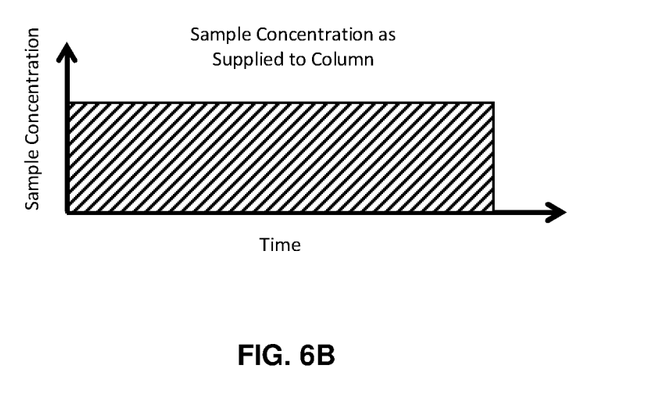
FIG. 6B illustrates a uniform sample concentration profile.

The feed solution from the reservoir is then supplied to the chromatography column, achieving the substantially uniform sample concentration over sample loading time profile indicated by FIG. 6B.

In an embodiment, the reservoir may be a pressure vessel. The pressure vessel may be divided into two chambers, a first chamber provided with a mixture with sample which mixes to form a feed solution, and a second chamber capable of exerting force upon the first chamber in order to pressurize the first chamber to deliver the feed solution to a sample loop in liquid communication with the chromatography column. In an embodiment, the second chamber is fed by the mobile phase and co-solvent mixture of the chromatography system. As used herein, the extraction vessel and pressure vessel together form an extraction-pressurization system. A sample loop as used herein refers to a system component such as a segment of tubing, which may be placed within a flowstream in order to receive or release contents.

In an embodiment, the chromatography system may be provided with a plurality of extraction-pressurization systems. The provision of two, or of more than two, extraction-pressurization systems is of particular value in applications where, for example, the extraction process itself or the substitution of extraction vessels is slow, and would result in excessive down-time for a chromatography system with a single extraction-pressurization system, or where the amount of sample obtained from the extraction is low, and providing the feed solution output of more than one extraction-pressurization system improves operation of the system. With more than one extraction-pressurization system, delay due to the extraction will be reduced because an extraction can occur simultaneously with loading of the column from another extraction-pressurization system. System down-time may be reduced because the operator can replace the extraction vessel of one extraction-pressurization system or perform maintenance on one extraction-pressurization system while the chromatography system continues to operate. Additionally, the two or more extraction-pressurization systems can operate in tandem to provide a larger quantity of feed solution to the chromatography column.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 2:
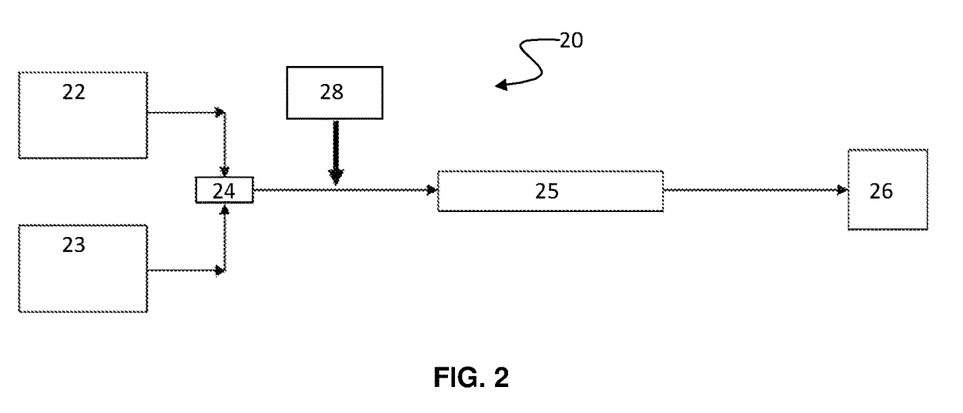
FIG. 2 schematically illustrates a prior art method of sample injection.

FIG. 2 illustrates one prior art system for injecting sample solution into a mobile phase stream. FIG. 2 schematically illustrates a chromatography system 20 including a mobile phase source 22, a co-solvent source 23, a mixing connector 24, and a chromatography column 25. The mobile phase source 22 supplies mobile phase, e.g., $CO_2$ and the co-solvent source 23 supplies a co-solvent, e.g., methanol, to the mixing connector 24. The mixing connector 24 mixes the co-solvent and mobile phase. The co-solvent and mobile phase mixture then passes from the mixing connector 24 to a chromatography column 25. After passing through the chromatography column 25, the mixture of mobile phase and co-solvent flows to a detector 26. As shown in FIG. 2, the method includes injecting a feed solution 28 including co-solvent and sample directly into the mobile phase and co-solvent mixture after the mixing connector 24. This method can lead to significant distortion of the chromatographic band even when injecting moderate volume of the feed solution because the co-solvent used to prepare the feed solution will not be the same as the mobile phase mixture of mobile phase and co-solvent, which results in a mismatch between the feed solvent and the mobile phase solution composition. In prior art $CO_2$-based or other highly-compressible fluid chromatography, this mismatch is inevitable because the mobile phase mixture comprises the compressible $CO_2$ and liquid organic co-solvent, but the sample is prepared in a liquid organic solvent only. If the sample's affinity for the co-solvent is greater than its affinity for the mobile phase and co-solvent mixture, a deformation of the sample band may occur because its frontal part moves at a relatively high velocity while the rear part of the sample band is more retained in the mobile phase co-solvent mixture. Deformation of the sample band may also occur even when the affinity of the sample is less in the co-solvent than in mobile phase and co-solvent mixture. This deformation may occur within the column, when the retention rate of sample in unmixed co-solvent differs from the rate in mobile phase and co-solvent mixture.

Figure 3:
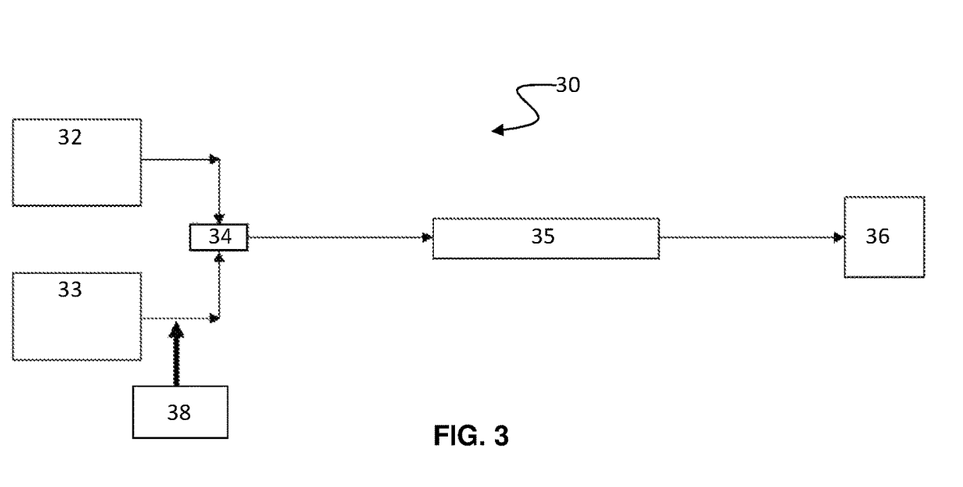
FIG. 3 schematically illustrates another prior art method of sample injection.

FIG. 3 illustrates another prior art injection system for injecting sample solution into the mobile phase stream. FIG. 3 schematically illustrates a chromatography system 30 including a mobile phase source 32, a co-solvent source 33, a mixing connector 34, and a chromatography column 35. The mobile phase source 32 supplies mobile phase, e.g., $CO_2$ and the co-solvent source 33 supplies a co-solvent, e.g., methanol, to the mixing connector 34. The mixing connector 34 mixes the co-solvent and mobile phase. The co-solvent and mobile phase mixture then passes from the mixing connector 34 to a chromatography column 35. After passing through the chromatography column 35, the mobile phase/co-solvent flows to a detector 36. As shown in FIG. 3, the method includes injecting the sample 38 directly into the co-solvent stream from the co-solvent source 33 before mixing the co-solvent with the mobile phase. Injecting the sample directly into the co-solvent stream alleviates the mismatch between the feed solution and the mobile phase composition, allowing larger sample volume to be injected into the system for separation. However, this injection mechanism has other limitations, especially when separating closely eluting components. For example, problems can arise because the co-solvent and sample are mixed with the mobile phase after the sample is introduced into the system. The mixing process can significantly disperse the sample band, resulting in high extra-column band dispersion. This, in turn, can lead to peak overlapping inside the column resulting in yield loss, especially if the target compound(s) have closely eluting impurities. Another problem related to this injection mechanism is the dependence of the amount of sample injected in a single injection, on the proportion of co-solvent in the mobile phase co-solvent mixture. In the prior art system, either the user must accept lower mass injection into the system or longer injection time—both of which lead to loss of productivity and separation performance.

Further problems plague conventional systems. For example, the mismatch in feed solvents versus mobile phase mixture composition (i.e., the flow stream containing $CO_2$ and any co-solvent) also creates solubility problems. In particular, the mismatch can lead to precipitation of the sample on system parts, such as frits, if, for example, the feed solubility in the mobile phase is decreased as compared to the feed in co-solvent. Due to the sensitivity of pressure and temperature controls in these systems, precipitation on system parts deteriorates system performance, and can even result in solute crashing of the system requiring the shutdown, disassembly and cleaning of the entire system. To avoid such laborious tasks as system shut-down, operators run the systems far below solubility limits of the feed solvent in the mobile phase.

To address such issues, an extraction vessel including the sample to be introduced into the system has been utilized. Referring to FIGS. 4A-4C, method 40 includes the use of a co-solvent pump 42 and mobile phase ($CO_2$) pump 44 for generating a mixed phase flow stream. A sample is introduced into the mixed phase flow stream via extraction vessel 46. A series of valves (48a, 48b, and 48c) are opened/closed to create conditions in which the method is initiated (mixed phase flow is provided to a column). The initiation or starting position is shown in FIG. 4A, in which valve 48a is opened and valve 48b and 48c are closed. To extract the sample from extraction vessel 46, the method 40 includes a pressurizing and separating step shown in FIG. 4B, in which valve 48b is opened and valve 48a remains open. In a final injection step, shown in FIG. 4C, valve 48a is closed and valve 48c is opened to inject the separated sample from the extraction vessel 46 into the column. While this method reduces the amount of precipitation, operators have less control over feed injection (e.g., varying injection amounts) as there is limited control over the flow from the extraction vessel. Additionally, the flow from the extraction vessel may exhibit inconsistent sample concentration across the flow.

Figure 5:
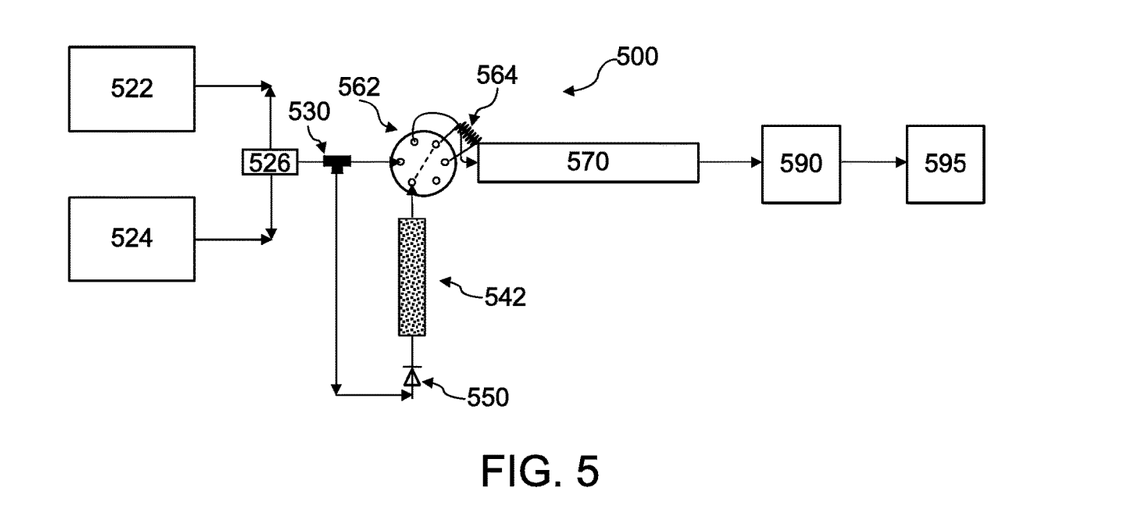
FIG. 5 schematically illustrates a sample extraction and injection system according to an embodiment of the present technology.

FIG. 5 illustrates an exemplary chromatography system 500. The system illustrated in FIG. 5 includes a single mobile phase source 522. The mobile phase source 522 provides mobile phase to a mixing connector 526. The system includes a co-solvent source 524. The co-solvent source 524 provides co-solvent to mixer 526. The mixer 526 is in fluid communication with a flow controller 530. The flow controller 530 is additionally in fluid communication with a valve 562 and an extraction vessel 542. The flow controller 530 can controllably direct flow to either or both of the valve 562 and the extraction vessel 542. The extraction vessel 542 is also in fluid communication with valve 562. Valve 562 is further in liquid communication with sample loop 564 and chromatography column 570. Downstream of the chromatography column 570 is an optional detector 590 and an optional back-pressure regulator 595 or some other recovery/collection/recycling mechanism.

Additionally, the system 500 depicts an optional one-way valve 550 interposed between the flow controller 530 and the extraction vessel 542. The one-way valve 550 is deployed such that the only permitted direction of flow through the one-way valve 550 is from the flow controller 530 to the extraction column 542

In an exemplary embodiment, the mobile phase source 522 and the co-solvent source 524 operate simultaneously to provide a mixture comprising mobile phase and co-solvent prepared by the mixer 526 and provided to the flow controller 530. Flow controller 530 directs flow of the mixture to valve 562, which is positioned to provide flow of the mixture to chromatography 570 to prepare chromatography column 570 with the mixture. The flow controller 530 additionally directs flow of the mixture to the extraction vessel 542, which contains the sample. As the mixture passes through the extraction vessel, it extracts sample, forming a feed solution comprising the mixture and sample. The feed solution is then conveyed by valve 562 to sample loop 564. Sample loop 564 provides for controlled injection of sample, as discussed below.

In an embodiment, a chromatography system may be designed with two sets of mobile phase and co-solvent sources, one to supply the flow path to the column, and the other to supply the flow path through the extraction vessel.

By incorporating the extraction vessel 542 onto the chromatography system 500, the system is able to achieve a concentration of sample within the feed solution that is closer to the saturation point for the parameters established for the system (i.e., solvents, pressure, temperature, etc.), provided that the flow rate through the extraction vessel 542 allows sufficient time for the extraction to occur, and sufficient sample is available in the extraction vessel. Near saturation concentrations are possible because the sample can be allowed to dissolve into the solution in the extraction vessel 542 until the solution is at or near saturation, if such a concentration is desired by the user.

The valve 562 can be a multi-port rotary shear seal valve having a plurality of fluidic ports and one or more flow-through conduits. Although described primarily as a rotary valve, other types of suitable valves can also be used including but not limited to, slider valves, solenoids, and pin valves. Each flow-through conduit provides a pathway between a pair of neighboring fluidic ports. When the valve rotates, its flow-through conduits move clockwise or counterclockwise depending upon the valve's direction of rotation. This movement operates to switch the flow-through conduit to a different pairing of neighboring fluidic ports, establishing a fluidic pathway between that different pair while removing the pathway from the previously connected pair of fluidic ports.

The valve 562 can be placed in a plurality of discrete positions. For example, those positions can include a first position corresponding to a LOAD state of the valve and a second position corresponding to an INJECT state of the valve. In the LOAD state, the flow controller 530 is in fluid communication with the chromatography column 570 and the extraction vessel 542 is in fluid communication with the sample loop 564. When in the LOAD state, the flow from the flow controller 530 through the one-way valve 550 and through the extraction vessel 542 will deliver a feed solution, comprising mobile phase, co-solvent, and sample to the sample loop 564.

In the INJECT state of the valve, the flow controller 530 can deliver a mixture of mobile phase and co-solvent through the sample loop 564 to the chromatography column 570, injecting the contents of the sample loop 564 onto the chromatography column 570. When in the INJECT state, flow from the extraction vessel 542 can be delivered to waste or to the recovery/collection/recycling mechanism 595. The operation of the valve is further explained in FIG. 12, especially in steps 1220, 1250, and 1260.

As discussed above, for certain analytes, the present technology may avoid low initial concentration or decreasing concentration by the addition of a reservoir system. That is, for certain analytes/system configurations, concentration of sample obtained from the extraction vessel can vary over time, reducing the quality of the separation. See FIG. 6A. To address inconsistent concentration during a separation, some embodiments of the present invention incorporate a reservoir system to maintain concentration throughout the separation. See FIG. 6B.

Figure 7:
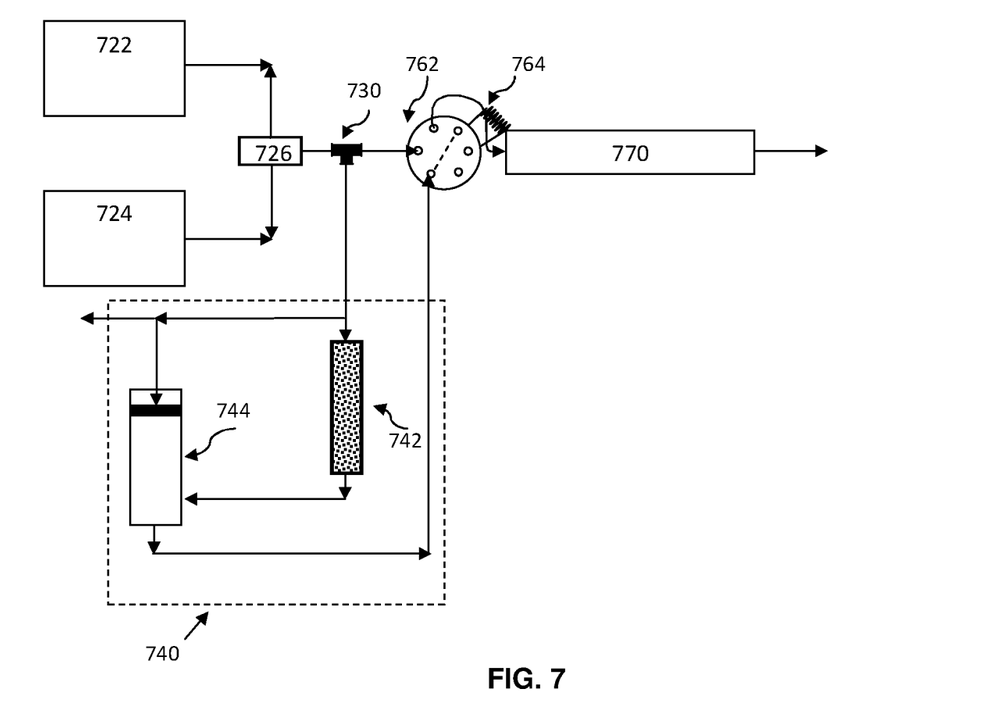
FIG. 7 schematically illustrates a chromatography system with a sample extraction and injection system according to an embodiment of the present technology.

In the embodiment depicted in FIG. 7, the reservoir is a pressure vessel 744. When the mixture of mobile phase from mobile phase source 722 and co-solvent from co-solvent source 724 (which are mixed by mixer 726) is supplied by flow controller 730 to an extraction vessel 742, the mixture dissolves sample. The mixture provided with sample is then supplied to the pressure vessel 744. Within the pressure vessel 744, the mixture with sample can mix, resulting in a feed solution with approximately uniform concentration of sample. The extraction vessel 742 and the pressure vessel 744 together constitute an extraction-pressurization system 740. The feed solution may then be introduced to a sample loop 764 through a valve 762 and then to a chromatography column 770, resulting in a substantially uniform sample concentration (as depicted in FIG. 6B) when loaded on the column 770. The embodiment pictured in FIG. 7 also shows an optional design feature wherein the pressure vessel 744 is also supplied directly by flow controller 730 to pressurize the delivery of feed solution. In other embodiments, the reservoir 744 may use another means to deliver the feed solution to the flowstream, including, but not limited to, a hydraulic system independent of the mobile phase source 722 and the co-solvent source 724, or a pump.

Figure 8:
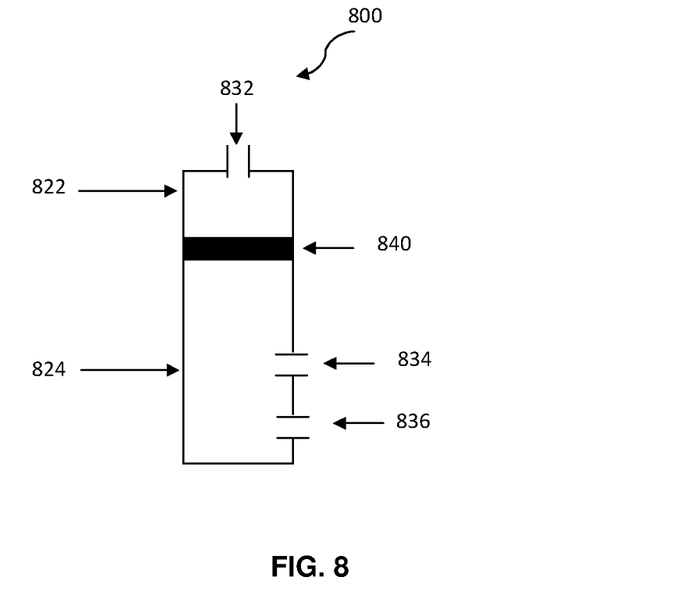
FIG. 8 schematically illustrates a pressure vessel for an extraction-pressurization system according to an embodiment of the present technology.

The design of the pressure vessel 744 depicted in FIG. 7 is shown enlarged as pressure vessel 800 in FIG. 8. Pressure vessel 800 contains two chambers, a first chamber 824, and a second chamber 822. The chambers are separated by a dividing means 840. The dividing means 840 separates the contents of the two chambers and may move or deform as dictated by the relative pressure of the two chambers, as for example, a movable piston, or a fixed, flexible diaphragm. The first chamber 824 has a fluid port 834 which receives mixture with sample from the extraction vessel, and a fluid port 836 which supplies feed solution to the flowpath. The second chamber 822 has a fluid port 832 through which fluid may enter and exit the second chamber 822 to achieve a desired pressure within the second chamber 822.

Figure 9:
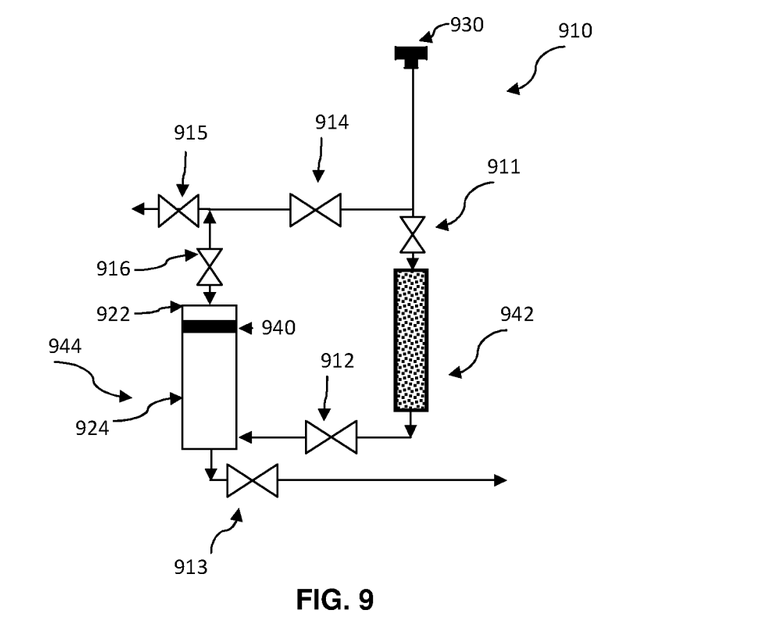
FIG. 9 schematically illustrates the operation of valves in an extraction-pressurization system according to an embodiment of the present technology.

The operation of a pressure vessel is further depicted in FIG. 9, which shows extraction-pressurization system 910 similar to the one shown in FIG. 7 as extraction-pressurization system 740, but also including an optional valve system comprising: valve 911, valve 912, valve 913, valve 914, valve 915, and valve 916.

In an embodiment, the extraction-pressurization system 910 has two principle operating modes, an EXTRACTION state and a LOAD state. The EXTRACTION state corresponds to collecting sample for injection to the chromatographic column and the LOAD state corresponds to providing the sample to the chromatographic column.

In the EXTRACTION state, the extraction-pressurization system 910 is configured such that valve 911 between the flow controller 930 and the extraction vessel 942 is open, allowing mixture to flow into the extraction vessel 942; valve 912 is open, allowing mixture supplied with sample to flow into the first chamber 924 of pressure vessel 944; valve 913 is closed, so that feed solution does not flow from the pressure vessel 944; valve 914 is closed, so that the mixture is not provided from flow controller 930 to the pressure vessel 944, but valve 916 and valve 915 are open, so that the second chamber 922 of pressure vessel 944 may be vented, for example, to waste or to a recovery system.

In the LOAD state, the extraction-pressurization system 910 is configured such that valve 911 between the flow controller 930 and the extraction vessel 942 is closed; valve 912 between the extraction vessel 942 and the pressure vessel 944 is also closed, such that additional mixture supplied with sample is not provided to the pressure vessel 944, and the feed solution in the pressure vessel 944 may not reverse flow into the extraction vessel 942; valve 914 between flow controller 930 and the second chamber 922 of the pressure vessel 944 is open; and valve 915 is closed, ending fluid communication with the waste or recovery system. In the LOAD state, the second chamber 922 is filled with pressurized mixture from the flow controller 930, which exerts pressure on the first chamber 924 through the action of a dividing means 940, and drives feed solution from the first chamber 924 of the pressure vessel 940 into the flowpath. In an embodiment, the feed solution will be loaded into a sample loop 764, as depicted in FIG. 7.

Figure 10A:
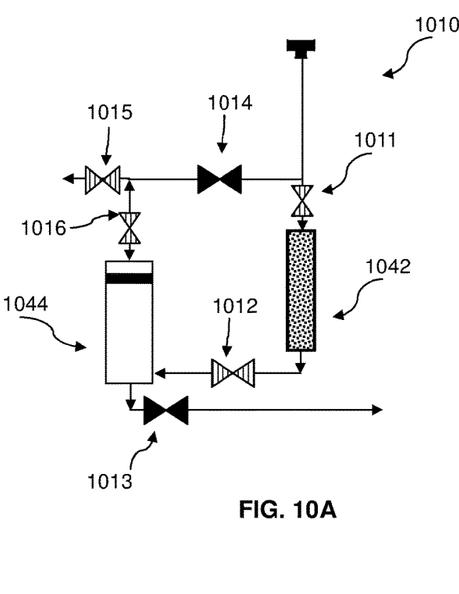
FIG. 10A schematically illustrates the operation of valves in an extraction-pressurization system according to an embodiment of the present technology.
Figure 10B:
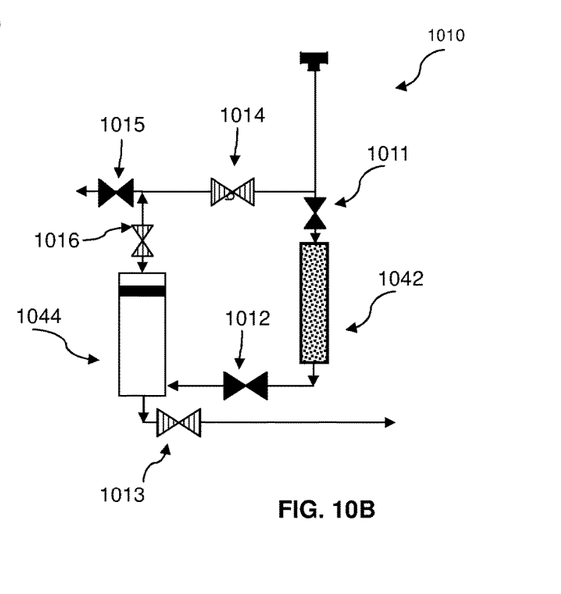
FIG. 10B schematically illustrates the operation of valves in an extraction-pressurization system according to an embodiment of the present technology.

FIG. 10A schematically illustrates the EXTRACTION state of extraction-pressurization system 1010, wherein valves 1011, 1012, 1015 and 1016 are open and valves 1013, 1014 are closed. FIG. 10B schematically illustrates the LOAD state, wherein valves 1011, 1012, and 1015 are closed, and valves 1014, 1016, 1013 are open. Extraction-pressurization system 1010 also includes pressure vessel 1044 and extraction vessel 1042.

Figure 11:
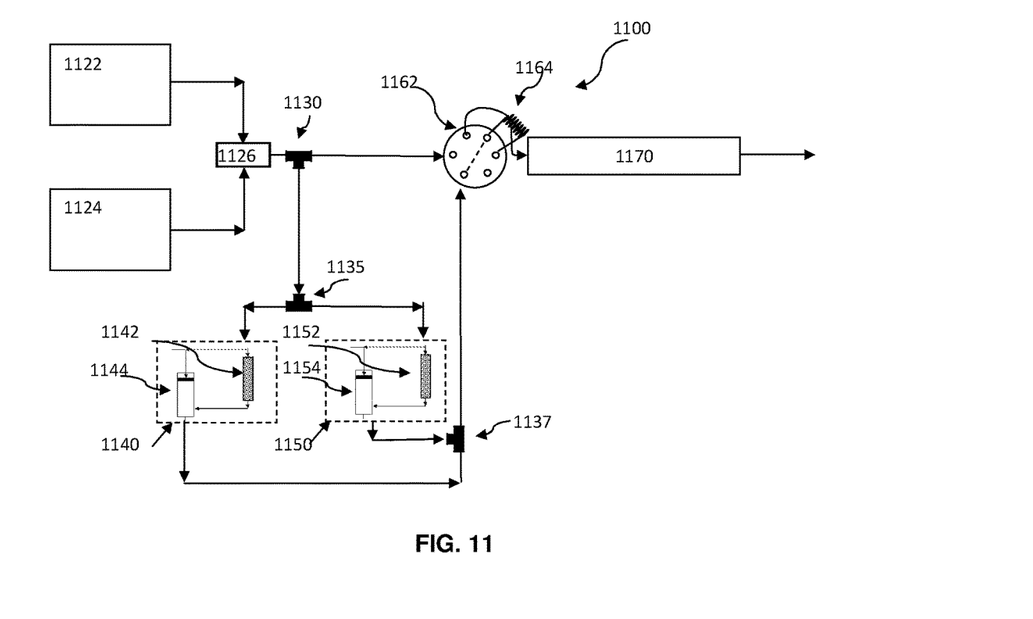
FIG. 11 schematically illustrates a sample extraction and injection system showing two extraction-pressurization systems according to an embodiment of the present technology.

Chromatography system 1100 in FIG. 11 depicts an embodiment with two extraction-pressurization systems, a first extraction-pressurization system 1140 and a second extraction-pressurization system 1150. As depicted, chromatography system 1100 has a second flow controller 1135 which is fed by a first flow controller 1130 and selectively feeds either the first extraction-pressurization system 1140 or the second extraction-pressurization system 1150 or both. In an embodiment, a single flow controller could provide the same function as flow controllers 1130 and 1135. The operation of each of extraction-pressurization system 1140 and extraction-pressurization system 1150 is substantially the same as extraction-pressurization system 740 of FIG. 7. The paired extraction-pressurization systems 1140 and 1150 of FIG. 11 offers the additional capability that one pressure-extraction system may be in EXTRACTION state while the other is in the LOAD state, thus allowing near-continuous operation. Further, chromatography system 1100 may be operated while one extraction-pressurization system is offline, for example for cleaning, repair, or substitution of an extraction vessel. Alternatively, both systems may be operated in tandem, providing injection from both systems near simultaneously. Additionally, the operation of the systems may be controlled by the user, to optimize the chromatography system 1100 for the user's application. Chromatography system 1100 also includes mobile phase source 1122, co-solvent source 1124, mixer 1126, valve 1162, sample loop 1164, chromatography column 1170, extraction vessels 1142 and 1152, pressure vessels 1144 and 1154, and coupler 1137.

Certain embodiments may feature multiple extraction-pressurization systems. For example, while, FIG. 7 illustrates a system having only one extraction-pressurization system, and FIG. 11 illustrates a system having two extraction-pressurization systems, a system in accordance with the present technology may include three or more extraction-pressurization systems.

Figure 12:
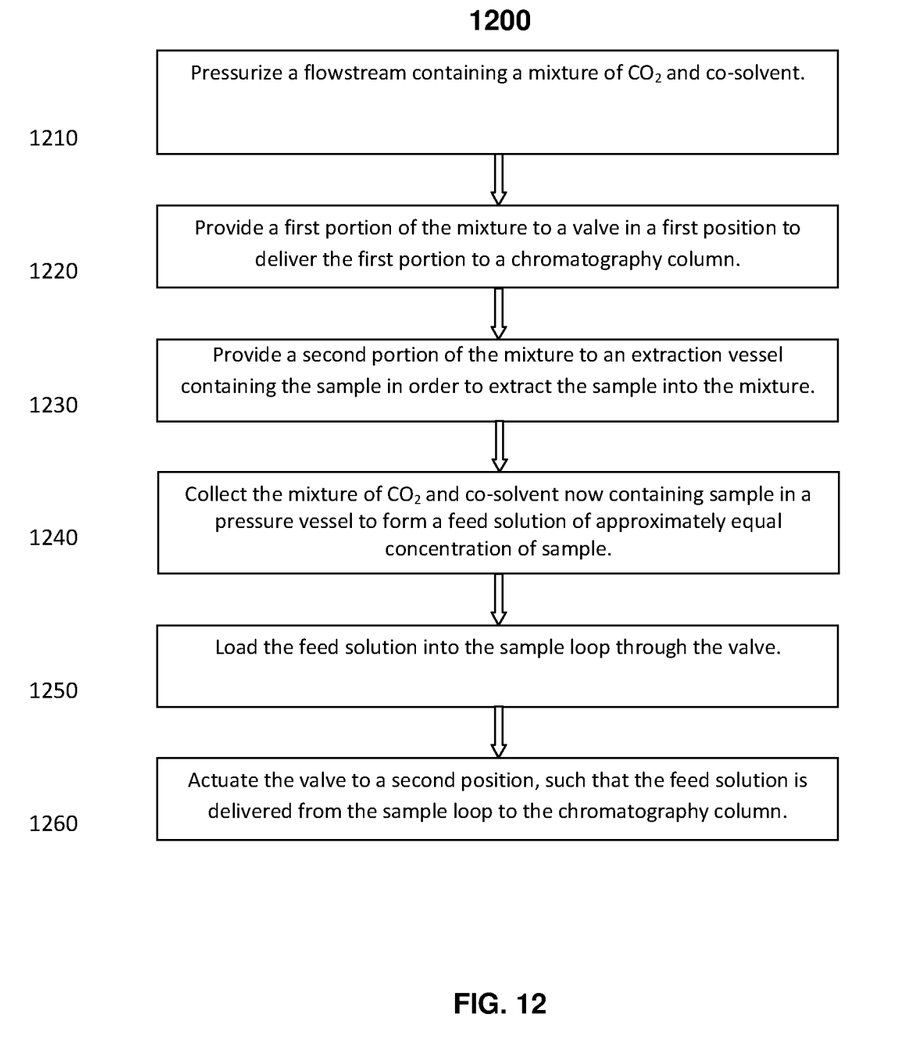
FIG. 12 is a flow chart that schematically illustrates a method for the operation of a sample extraction and injection system according to an embodiment of the present technology.

FIG. 12 is a flow chart, showing the steps by which an embodiment of a chromatography system with an extraction-pressurization system may be operated, i.e., method 1200. Step 1210 of method 1200 provides for pressurizing a flow path with a mixture of $CO_2$ and co-solvent. The $CO_2$ referenced in FIG. 12, is maintained at sufficient temperature and pressure to be a fluid, i.e. a highly compressible fluid. Systems of this type may be referred to as supercritical fluid chromatography (SFC) or $CO_2$-based chromatography. In other embodiments, the system may be provided with other highly compressible fluids. The co-solvent is usually an organic solvent or a mixture of organic solvents. In other embodiments, the system may be provided with more than one co-solvent and the relative concentrations of those co-solvents may be adjusted during the chromatographic separation, i.e. a gradient separation.

Step 1220 of method 1200 provides for a first portion of the mixture to be provided to a valve in a first position to deliver the first portion to a chromatography column. The first portion provided to the chromatography column can serve to flush any contaminant remaining within the column and, additionally, may be used to treat the column with the desired mobile phase and co-solvent mixture. In some embodiments, the valve may be a multi-port rotary shear seal valve having a plurality of fluidic ports and one or more flow-through conduits, wherein each flow-through conduit provides a pathway between a pair of neighboring fluidic ports. When the valve rotates, its flow-through conduits move clockwise or counterclockwise depending upon the valve's direction of rotation. This movement operates to switch the flow-through conduit to a different pairing of neighboring fluidic ports, establishing a fluidic pathway between that different pair while removing the pathway from the previously connected pair of fluidic ports. In other embodiments, other suitable valves can also be used including but not limited to, slider vales, solenoids, and pin valves.

Step 1230 of method 1200 provides a second portion of the mixture to an extraction vessel which has been supplied with sample. In an embodiment, the first portion of Step 1220 and the second portion of Step 1230 may be provided by a single set of mobile phase and co-solvent sources which feed a splitter or a valve to provide the first portion and the second portion. Alternatively, in an embodiment, two sets of mobile phase and co-solvent sources may be provided. In a third embodiment, a single mobile phase source may provide mobile phase to a splitter or valve and two co-solvent sources may be used, a first co-solvent source to provide co-solvent to be mixed with mobile phase from the splitter to provide the first portion and a second co-solvent source to be mixed with mobile phase from the splitter to provide the second portion.

Step 1240 of method 1200 provides for collecting the mixture of $CO_2$ and co-solvent with sample from the extraction vessel in a pressure vessel. In other embodiments, other reservoirs may be used in place of a pressure vessel. In either case, the pressure vessel or reservoir permits the sample within the mobile-phase and co-solvent mixture as provided from the extraction vessel to distribute evenly throughout the mobile phase and co-solvent mixture so that the concentration of sample throughout the pressure vessel or reservoir is approximately the same. Additionally, the pressure vessel or reservoir may be provided with a means to increase the rate of mixture within the pressure vessel. The mobile phase and co-solvent with sample that has been allowed sufficient time to mix and achieve a uniform concentration of sample comprise a feed solution.

Step 1250 of method 1200 provides for the feed solution prepared in Step 1240 to be provided from the pressure vessel to a sample loop by the operation of a valve. The sample loop permits the loading of the sample by means of the further operation of the valve. While the sample loop depicted in, for example, FIG. 7 is shown as a coil of tubing, the sample loop may be any chamber into which the feed solution may be supplied and from which it may be controllably introduced to the pressurized flow path leading to the chromatography column. In an embodiment, the pressure vessel or reservoir of Step 1240 may be used to provide the feed solution delivery.

Step 1260 of method 1200, provides for actuating the valve to provide the feed solution to the chromatography column. In an embodiment, the actuation of the valve described in Step 1260 introduces the loaded sample loop into the first portion of the mixture described in Step 1220, which is a portion of mobile phase and co-solvent not provided with sample and to the chromatography column. In this embodiment, actuation of the valve would also serve to disconnect the sample loop from the pressure vessel described in Step 1240. Alternatively, in the context of an embodiment without a pressure vessel, as for example that of FIG. 5, actuating valve 562 would disconnect sample loop 564 from fluid communication with extraction vessel 542 and provide the feed solution in sample loop 564 to chromatographic column 570.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A chromatography system comprising:
    a co-solvent source and a mobile phase source in fluid communication with a mixer to form a first mixed solution;
    a splitter to form a first flowstream and a second flowstream from the mixed solution, wherein the first flowstream and second flowstream are separate and not in fluid communication;
    a sample extraction vessel in fluid communication with the second flowstream;
    a sample loop;
    a chromatography column;
    a valve, the valve having a plurality of discrete positions forming different fluidic connections including (i) a first position in which the first flowstream is in fluid communication with the chromatography column and the second flowstream is in fluid communication with the sample loop and (ii) a second position in which the first flowstream is in fluid communication with the sample loop and the sample loop is in fluid communication with the chromatography column; and
    a pressure vessel positioned within the second flowstream and comprising a first inflow port, a second inflow port, and an outflow port, wherein the first inflow port in is fluid communication with the second flowstream prior to an inlet to the sample extraction vessel and the second inflow port is in fluid communication with an outflow from the sample extraction vessel.

2. The chromatography system of claim 1, wherein the mobile phase comprises $CO_2$.

3. The chromatography system of claim 1, wherein the co-solvent is selected from the group consisting of methanol, ethanol, isopropanol, acetonitrile, acetone, tetrahydrofuran, and mixtures thereof.

4. The chromatography system of claim 1 further comprising a one-way valve, interposed in the second flowstream before the extraction vessel.

5. The chromatography system of claim 1, wherein the pressure vessel further comprises a piston moveably disposed between the first inflow port and the second inflow port, the piston fluidly separating the pressure vessel into two chambers, a first chamber in fluid communication with the first inflow port and a second chamber in fluid communication with the second inflow port.

6. The chromatography system of claim 5, wherein the first inflow port allows for venting from the first chamber to waste.

7. The chromatography system of claim 1, further comprising a second sample extraction vessel and a second pressure vessel, and wherein the second flowstream is divided into a first portion and a second portion, the second portion being directed to the at least one of the second extraction vessel and the second pressure vessel.

8. The chromatography system of claim 1, comprising three or more extraction vessels.

9. A method of preparing a sample feed in a chromatography solution comprising:
    pressurizing a first flowstream through a valve to a chromatography column with a mixture, the mixture comprising mobile phase and co-solvent;
    pressurizing a second flowstream by introducing the mixture into an extraction vessel, the extraction vessel containing a sample, and then introducing the mixture with sample through the valve and to a sample loop, wherein the second flowstream flows into a first inflow port prior to flowing to an inlet to the sample extraction vessel, and flows through a second inflow port to an outlet of the sample extraction vessel;
    actuating the valve to introduce the mixture with sample in the sample loop into the chromatography column.

10. The method of claim 9, wherein a one-way valve is added in the second flowstream before the extraction vessel.

11. The method of claim 9, wherein a pressure vessel is added between the extraction vessel and the valve.

12. The method of claim 9 wherein the mobile phase is $CO_2$.

13. A method for obtaining a substantially equal concentration of sample throughout a feed solution for a chromatography column, the feed solution comprising a sample, a mobile phase, and a co-solvent, by pressurizing a flowstream to a chromatography column with a mixture, the mixture comprising the mobile phase and the co-solvent;

preparing the feed solution in a primary extraction-pressurization system by supplying the mixture to an extraction vessel in the primary extraction-pressurization system and subsequently supplying the mixture supplied with sample to a reservoir in the primary extraction-pressurization system to create a feed solution from the mixture supplied with sample; and supplying the feed solution from the primary extraction-pressurization system to the flowstream.

14. The method of claim 13 wherein the reservoir is a pressure vessel.

15. The method of claim 14, the pressure vessel having two chambers separated by an impermeable but movable or flexible dividing means, the first chamber being in fluid communication with the extraction vessel and with the flowstream and the second chamber being in fluid communication with a pressurized supply of the mixture.

16. The method of claim 13, wherein a valve is interposed in the flowstream and in liquid communication with the primary extraction-pressurization system.

17. The method of claim 16, wherein the primary extraction-pressurization system supplies the feed solution through the valve to a sample loop.

18. A method for permitting simultaneous extraction of a sample and loading of a chromatography column by providing a secondary extraction-pressurization system to the method of claim 12 which alternates with the primary extraction-pressurization system in preparing the feed solution and supplying the feed solution to the flowstream to allow continuous operation.

* * * * *